US012576991B1

(12) United States Patent
King

(10) Patent No.: US 12,576,991 B1
(45) Date of Patent: Mar. 17, 2026

(54) METHOD FOR FORMING AN INSPECTION ACCESS PASSAGE FOR AN AIRCRAFT PROPULSION SYSTEM

(71) Applicant: RTX Corporation, Farmington, CT (US)

(72) Inventor: Christopher R. King, Terryville, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/980,746

(22) Filed: Dec. 13, 2024

(51) Int. Cl.
 *B64F 5/60* (2017.01)
 *F01D 21/00* (2006.01)
(52) U.S. Cl.
 CPC .............. *B64F 5/60* (2017.01); *F01D 21/003* (2013.01)
(58) Field of Classification Search
 CPC ................................ B64F 5/60; F01D 21/003
 See application file for complete search history.

(56) References Cited

U.S. PATENT DOCUMENTS

| | | | |
|---|---|---|---|
| 2,946,221 A | | 7/1960 | Annear |
| 6,542,230 B1 * | | 4/2003 | Luke .................. B23K 26/0884 |
| | | | 356/241.1 |
| 7,302,851 B2 | | 12/2007 | Czerw |
| 11,813,706 B2 * | | 11/2023 | Craig ....................... F01D 5/288 |
| 12,195,202 B1 * | | 1/2025 | Andalam .................. B64F 5/60 |
| 2016/0194088 A1 * | | 7/2016 | Leutard ..................... B64F 5/60 |
| | | | 415/118 |
| 2020/0180084 A1 * | | 6/2020 | Lipkin ........................ B25J 1/02 |
| 2021/0388737 A1 * | | 12/2021 | Foxall ................... F01D 21/003 |
| 2022/0135254 A1 * | | 5/2022 | Graham ................ B25J 11/008 |
| | | | 700/258 |
| 2022/0268170 A1 * | | 8/2022 | Andalam .............. F01D 25/285 |
| 2024/0133309 A1 * | | 4/2024 | Bidkar .................. F01D 11/003 |
| 2024/0353737 A1 * | | 10/2024 | Hagen ................... G03B 11/04 |
| 2025/0067195 A1 * | | 2/2025 | Mangardich .......... G01M 15/14 |

* cited by examiner

*Primary Examiner* — Kyle A Cook
(74) *Attorney, Agent, or Firm* — Getz Balich LLC

(57) ABSTRACT

A method for forming an access passage for a gas turbine engine of an aircraft propulsion system includes installing a tooling jig on an engine case of the gas turbine engine at a port at a turbine section radially outward of a turbine vane stage, aligning the tooling jig on the engine case and fixedly mounting the tooling jig on the engine case, and drilling a first access aperture of the access passage through the inner ring along the tooling axis with a drill bit inserted into the first turbine vane through a tooling aperture of the tooling jig. The access passage extends through the turbine vane stage to a rotor cavity disposed radially inward of the turbine vane stage and between an upstream rotor stage and a downstream rotor stage of a bladed turbine rotor.

20 Claims, 10 Drawing Sheets

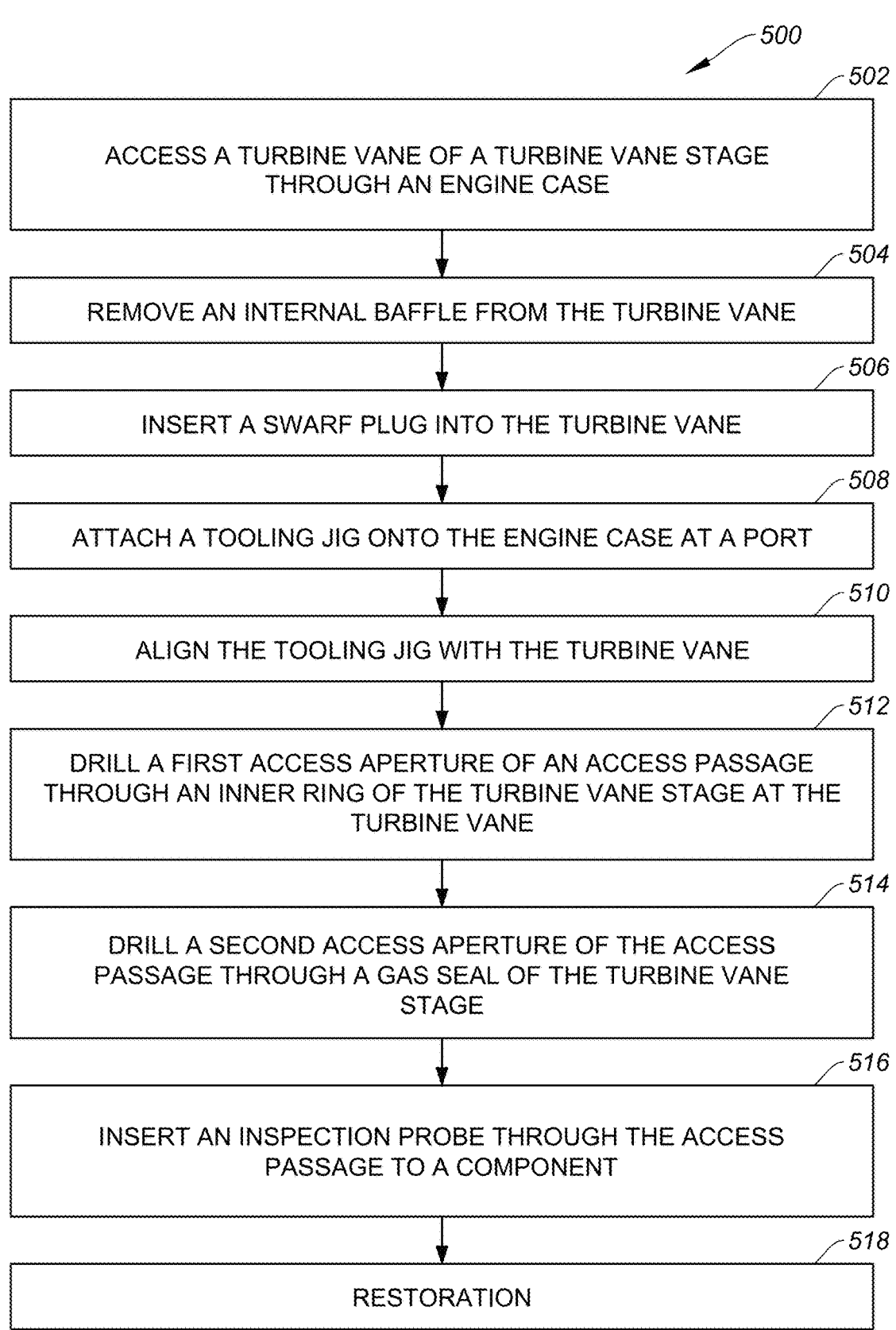

_500_

_502_

ACCESS A TURBINE VANE OF A TURBINE VANE STAGE
THROUGH AN ENGINE CASE

_504_

REMOVE AN INTERNAL BAFFLE FROM THE TURBINE VANE

_506_

INSERT A SWARF PLUG INTO THE TURBINE VANE

_508_

ATTACH A TOOLING JIG ONTO THE ENGINE CASE AT A PORT

_510_

ALIGN THE TOOLING JIG WITH THE TURBINE VANE

_512_

DRILL A FIRST ACCESS APERTURE OF AN ACCESS PASSAGE
THROUGH AN INNER RING OF THE TURBINE VANE STAGE AT THE
TURBINE VANE

_514_

DRILL A SECOND ACCESS APERTURE OF THE ACCESS
PASSAGE THROUGH A GAS SEAL OF THE TURBINE VANE
STAGE

_516_

INSERT AN INSPECTION PROBE THROUGH THE ACCESS
PASSAGE TO A COMPONENT

_518_

RESTORATION

_FIG. 5_

METHOD FOR FORMING AN INSPECTION ACCESS PASSAGE FOR AN AIRCRAFT PROPULSION SYSTEM

BACKGROUND

1. Technical Field

This disclosure relates generally to the inspection of aircraft propulsion system components using non-destructive testing techniques and, more particularly, to methods for facilitating component access for inspections.

2. Background Information

Various systems and methods are known in the art for inspecting aircraft propulsion system components for internal defects, and for accessing said aircraft propulsion system components with inspection equipment. While these known inspection systems and methods have various benefits, there is still room in the art for improvement.

SUMMARY

According to an aspect of the present disclosure, a method for forming an access passage for a gas turbine engine of an aircraft propulsion system includes installing a tooling jig on an engine case of the gas turbine engine at a port. The port is disposed at a turbine section of the gas turbine engine radially outward of a turbine vane stage. The tooling jig forms a tooling aperture extending through the tooling jig along a tooling axis. The method further includes aligning the tooling jig on the engine case by inserting an alignment tool through the tooling aperture and into a first turbine vane of the turbine vane stage along the tooling axis and, with the alignment tool disposed within the tooling aperture and the first turbine vane, fixedly mounting the tooling jig on the engine case such that the tooling axis extends through an internal cavity of the first turbine vane to an inner ring of the turbine vane stage and drilling a first access aperture of the access passage through the inner ring along the tooling axis with a first drill bit inserted into the first turbine vane through the tooling aperture. The access passage extends through the turbine vane stage to a rotor cavity disposed radially inward of the turbine vane stage. The rotor cavity is further formed by and axially between an upstream rotor stage and a downstream rotor stage of a bladed turbine rotor relative to a rotational axis of the bladed turbine rotor.

In any of the aspects or embodiments described above and herein, installing the tooling jig on the engine case may include installing the tooling jig on the engine case with a plurality of mechanical fasteners in a loosened state and fixedly mounting the tooling jig on the engine case may include fixedly mounting the tooling jig with the plurality of mechanical fasteners.

In any of the aspects or embodiments described above and herein, the method may further include removing an internal baffle from the first turbine vane through the port prior to installing the tooling jig on the engine case.

In any of the aspects or embodiments described above and herein, the method may further include removing a cooling air pipe connected at the port from the engine case prior to installing the tooling jig on the engine case.

In any of the aspects or embodiments described above and herein, the method may further include installing a swarf collection plug into the first turbine vane through the port prior to installing the tooling jig on the engine.

In any of the aspects or embodiments described above and herein, the swarf collection plug may extend between and to an inner radial plug end and an outer radial plug end, the swarf collection plug may form a swarf collection cavity enclosed at the inner radial plug end, and installed into the first turbine vane the inner radial plug end may be disposed at the inner ring.

In any of the aspects or embodiments described above and herein, the tooling jig may include a jig body and a bushing selectively attachable on the jig body, fixedly mounting the tooling jig on the engine case may include fixedly mounting the jig body on the engine case, and the bushing may form the tooling aperture through the tooling jig along the tooling axis.

In any of the aspects or embodiments described above and herein, the method may further include, subsequent to drilling the first access aperture, drilling a second access aperture of the access passage through a gas seal along the tooling axis with a second drill bit inserted through the tooling aperture. The gas seal may be mounted on the inner ring. The gas seal may be disposed radially between the inner ring and the rotor cavity. The gas seal may be in sealing engagement with the upstream rotor stage and the downstream rotor stage.

In any of the aspects or embodiments described above and herein, the method may further include inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

In any of the aspects or embodiments described above and herein, the steps of inserting the probe and inspecting the one or both of the upstream rotor stage or the downstream rotor stage may be performed with the aircraft propulsion system installed on an aircraft.

According to another aspect of the present disclosure, a method for forming an access passage for a gas turbine engine of an aircraft propulsion system includes installing a tooling jig on an engine case of the gas turbine engine at a port. The port is disposed at a turbine section of the gas turbine engine radially outward of a turbine vane stage. The tooling jig forms a tooling aperture extending through the tooling jig along a tooling axis. The tooling axis extends through an internal cavity of a first turbine vane of the turbine vane stage to an inner ring of the turbine vane stage. The method further includes drilling a first access aperture of the access passage through the inner ring along the tooling axis with a first drill bit extending through the tooling aperture and drilling a second access aperture of the access passage through a gas seal along the tooling axis with a second drill bit extending through the tooling aperture. The gas seal is mounted on the inner ring. The gas seal forms a rotor cavity disposed radially inward of the gas seal. The rotor cavity is further formed by and between an upstream rotor stage and a downstream rotor stage of a bladed turbine rotor relative to a rotational axis of the bladed turbine rotor. The access passage extends through the port, the internal cavity, the first access aperture, and the second access aperture along the tooling axis.

In any of the aspects or embodiments described above and herein, the gas seal may include a seal body, a first seal member, and a second seal member. The first seal member and the second seal member may be mounted on the seal body. The first seal member may be disposed in sealing engagement with the upstream rotor stage. The second seal member may be disposed in sealing engagement with the downstream rotor stage. The second access aperture may extend through the seal body between the first seal member and the second seal member.

In any of the aspects or embodiments described above and herein, the method may further include installing a swarf collection plug into the first turbine vane through the port prior to installing the tooling jig on the engine case.

In any of the aspects or embodiments described above and herein, the method may further include inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

In any of the aspects or embodiments described above and herein, the upstream rotor stage may include a first rotor disk, the downstream rotor stage may include a second rotor disk, the first rotor disk and the second rotor disk may form the rotor cavity, and positioning the probe on the one or both of the upstream rotor stage or the downstream rotor stage may include positioning the probe at a plurality of inspection sites on surfaces of the first rotor disk and the second rotor disk forming the rotor cavity.

According to another aspect of the present disclosure, a method for forming an access passage for a gas turbine engine of an aircraft propulsion system includes removing a cooling air pipe connected at a port of the engine. The port is disposed at an engine case surrounding a turbine section of the gas turbine engine radially outward of a turbine vane stage. The turbine vane stage includes a first turbine vane. The first turbine vane includes an internal cavity and an internal baffle disposed within the internal cavity. The method further includes removing the internal baffle from the first turbine vane through the port and installing a tooling jig on the engine case at the port. The tooling jig forms a tooling aperture extending through the tooling jig along a tooling axis. The method further includes drilling a first access aperture of the access passage through an inner ring of the turbine vane stage along the tooling axis with a first drill bit inserted into the first turbine vane through the tooling aperture, the access passage extending through the turbine vane stage to a rotor cavity disposed radially inward of the turbine vane stage, the rotor cavity further formed by and axially between an upstream rotor stage and a downstream rotor stage of a bladed turbine rotor relative to a rotational axis of the bladed turbine rotor.

In any of the aspects or embodiments described above and herein, the method may further include installing a swarf collection plug into the first turbine vane through the port prior to installing the tooling jig on the engine case.

In any of the aspects or embodiments described above and herein, removing the internal baffle from the first turbine vane may include machining at least a portion of the internal baffle.

In any of the aspects or embodiments described above and herein, the method may further include, subsequent to drilling the first access aperture, drilling a second access aperture of the access passage through a gas seal along the tooling axis with a second drill bit inserted through the tooling aperture. The gas seal may be mounted on the inner ring. The gas seal may be disposed radially between the inner ring and the rotor cavity. The gas seal may be in sealing engagement with the upstream rotor stage and the downstream rotor stage.

In any of the aspects or embodiments described above and herein, the method may further include inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 5 illustrates a block diagram depicting a method for forming an access passage for a rotor cavity of the gas turbine engine to facilitate component inspection using the inspection system, in accordance with one or more embodiments of the present disclosure.

DETAILED DESCRIPTION

Figure 1:
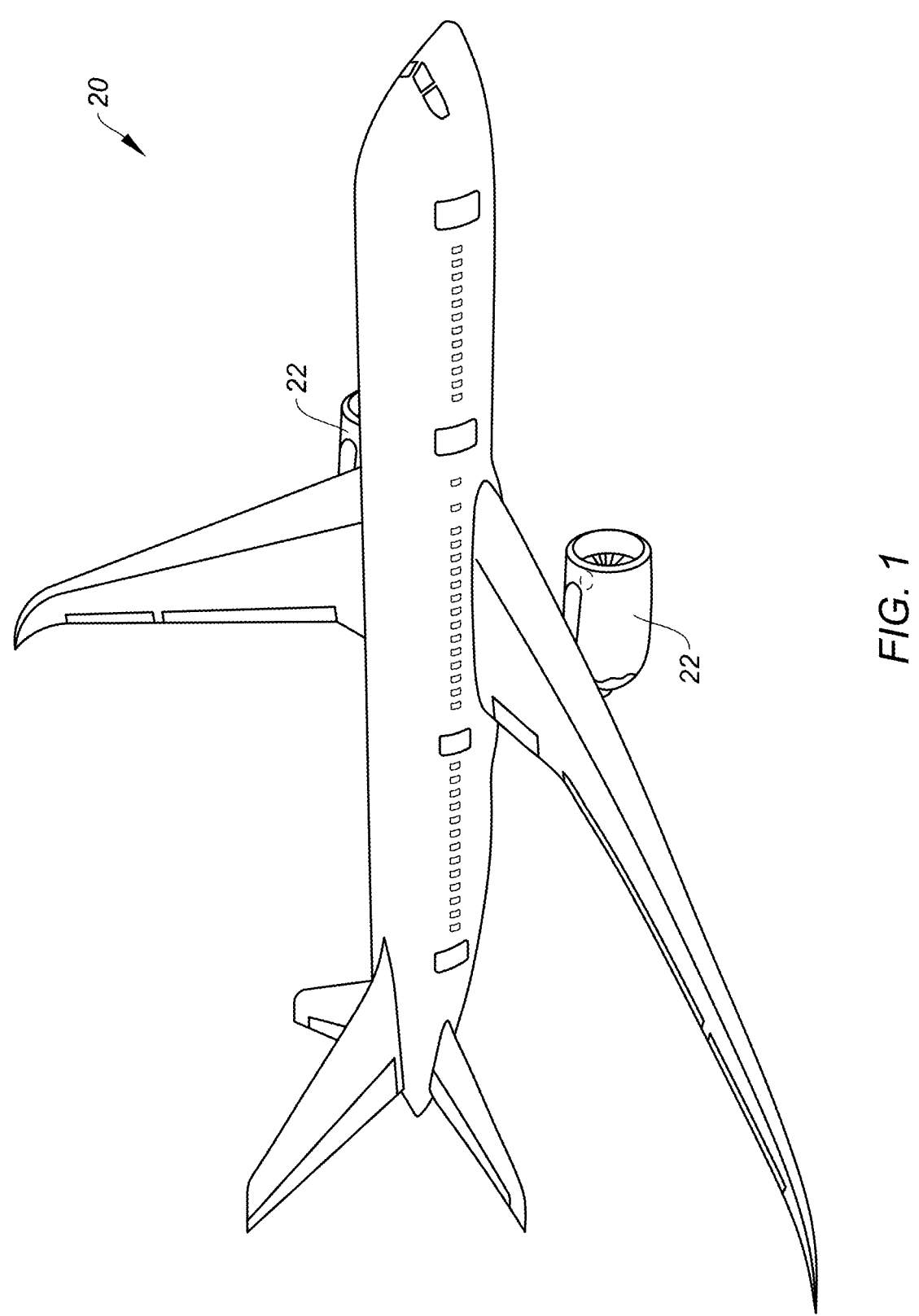
FIG. 1 illustrates a perspective view of an aircraft including a propulsion system, in accordance with one or more embodiments of the present disclosure.
Figure 2:
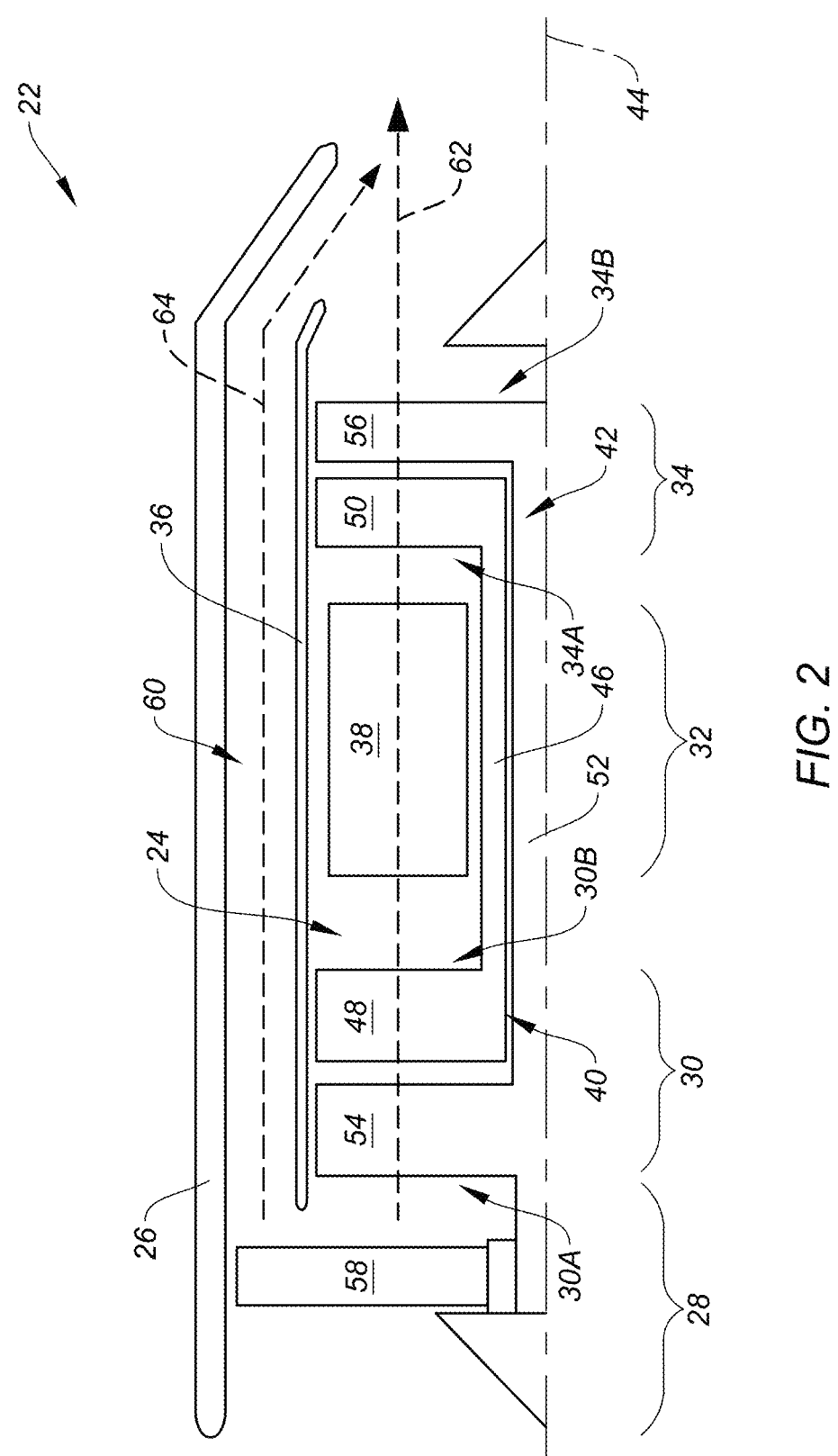
FIG. 2 schematically illustrates a cutaway, side view of an aircraft propulsion system including a gas turbine engine, in accordance with one or more embodiments of the present disclosure.

FIG. 1 illustrates an aircraft 20 including a propulsion system 22. Briefly, the aircraft 20 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft 20 may be a manned aerial vehicle or an unmanned aerial vehicle (UAV, e.g., a drone). FIG. 2 schematically illustrates a cutaway, side view of the propulsion system 22. The propulsion system 22 of FIG. 2 includes a gas turbine engine 24 and a nacelle 26.

The gas turbine engine 24 of FIG. 2 is configured as a multi-spool turbofan gas turbine engine 24. However, while the following description and accompanying drawings may refer to the turbofan gas turbine engine 24 of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 24 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 38 (e.g., an annular combustor). The turbine section 34 includes a high-pressure turbine (HPT) 34A and a low-pressure turbine (LPT) 34B.

Components of the fan section 28, the compressor section 30, and the turbine section 34 form a first rotational assembly 40 (e.g., a high-pressure spool) and a second rotational assembly 42 (e.g., a low-pressure spool) of the gas turbine engine 24. The first rotational assembly 40 and the second rotational assembly 42 are mounted for rotation about a rotational axis 44 (e.g., an axial centerline) of the gas turbine engine 24 relative to the engine static structure 36.

The first rotational assembly 40 includes a first shaft 46, a bladed first compressor rotor 48 for the high-pressure compressor 30B, and a bladed first turbine rotor 50 for the high-pressure turbine 34A. The first shaft 46 interconnects the bladed first compressor rotor 48 and the bladed first turbine rotor 50.

The second rotational assembly 42 includes a second shaft 52, a bladed second compressor rotor 54 for the low-pressure compressor 30A, a bladed second turbine rotor 56 for the low-pressure turbine 34B, and a bladed fan rotor 58 for the fan section 28. The second shaft 52 interconnects the bladed second compressor rotor 54 and the bladed second turbine rotor 56. The second shaft 52 may additionally interconnect the bladed fan rotor 58 with the bladed second compressor rotor 54 and the bladed second turbine rotor 56. Alternatively, the second shaft 52 may be coupled with the bladed fan rotor 58 by a gear assembly (e.g., a reduction gear box (RGB)). The first shaft 46 and the second shaft 52 are concentric and configured to rotate about the rotational axis 44. The present disclosure, however, is not limited to concentric configurations of the first shaft 46 and the second shaft 52.

The engine static structure 36 may include one or more engine cases, cowlings, bearing assemblies, inner fixed structures, and/or other non-rotating structures configured to house and/or support (e.g., rotationally support) components of the gas turbine engine sections 28, 30, 32, 34. The engine static structure 36 may form an exterior (e.g., an outer radial portion) of the gas turbine engine 24.

The nacelle 26 is configured to house and form an aerodynamic cover for the gas turbine engine 24. The nacelle 26 may extend circumferentially about (e.g., completely around) the gas turbine engine 24 and its rotational axis 44. The nacelle 26 may circumscribe and form an annular bypass duct 60 through the propulsion system 22. For example, the bypass duct 60 may be formed by and between (e.g., radially between) the gas turbine engine 24 (e.g., the engine static structure 36) and the nacelle 26.

In operation of the gas turbine engine 24, ambient air is directed through the fan section 28 and into a core flow path 62 (e.g., an annular flow path) and a bypass flow path 64 (e.g., an annular flow path) by rotation of the bladed fan rotor 58. Air flow along the core flow path 62 is compressed by the low-pressure compressor 30A and the high-pressure compressor 30B, mixed and burned with fuel in the combustor 38, and then directed through the high-pressure turbine 34A and the low-pressure turbine 34B. The bladed first turbine rotor 50 and the bladed second turbine rotor 56 rotationally drive the first rotational assembly 40 and the second rotational assembly 42, respectively, in response to the combustion gas flow through the high-pressure turbine 34A and the low-pressure turbine 34B. Air flow along the bypass flow path 64 is directed through the bypass duct 60.

Figure 3:
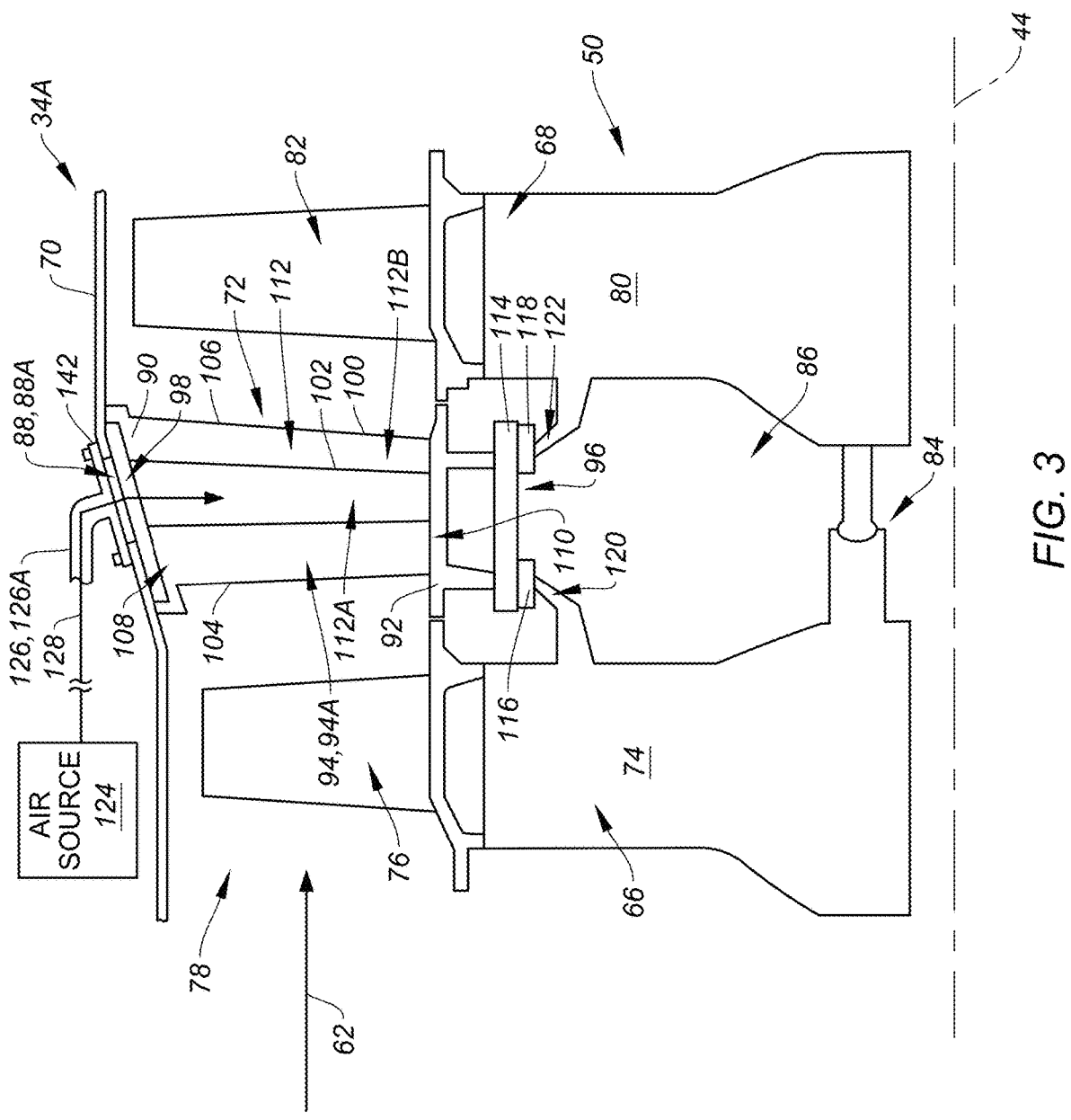
FIG. 3 schematically illustrates a portion of a turbine section of the gas turbine engine including a turbine vane stage, in accordance with one or more embodiments of the present disclosure.

FIG. 3 schematically illustrates a portion of the high-pressure turbine 34A. The bladed first turbine rotor 50 of FIG. 3 includes an upstream rotor stage 66 and a downstream rotor stage 68. The engine static structure 36 of FIG. 3 includes an engine case 70 and a turbine vane stage 72. As an example, the upstream rotor stage 66 may be a first rotor stage of the high-pressure turbine 34A, the downstream rotor stage 68 may be a second rotor stage of the high-pressure turbine 34A, and the turbine vane stage 72 may be a second vane stage of the high-pressure turbine 34A between (e.g., axially between) the upstream rotor stage 66 and the downstream rotor stage 68.

The upstream rotor stage 66 includes a rotor disk 74 and a plurality of turbine blades 76. The rotor disk 74 extends circumferentially about (e.g., completely around) the rotational axis 44. The turbine blades 76 are mounted onto and arrayed circumferentially about the rotor disk 74. The turbine blades 76 extend radially outward from the rotor disk 74 into a core flow passage 78 (e.g., an annular core flow passage) through the high-pressure turbine 34A. Similarly, the downstream rotor stage 68 includes a rotor disk 80 and a plurality of turbine blades 82. The rotor disk 80 extends circumferentially about (e.g., completely around) the rotational axis 44. The turbine blades 82 are mounted onto and arrayed circumferentially about the rotor disk 80. The turbine blades 82 extend radially outward from the rotor disk 80 into the core flow passage 78. The rotor disk 74 and the rotor disk 80 may be mounted together at an attachment interface 84 between (e.g., axially between) the rotor disks 74, 80. The rotor disk 74 and the rotor disk 80 form a rotor cavity 86 (e.g., a sealed, annular rotor cavity) therebetween. The rotor cavity 86 is formed by and between (e.g., axially between) the rotor disk 74 and the rotor disk 80. The rotor cavity 86 may be further formed between (e.g., radially between) the attachment interface 84 and the turbine vane stage 72.

The engine case 70 extends circumferentially about (e.g., completely around) the rotational axis 44 and circumscribes the high-pressure turbine 34A. The engine case 70 forms an outer radial boundary of the core flow passage 78 through the high-pressure turbine 34A. The engine case 70 forms one or more turbine cooling air (TCA) ports 88 through (e.g., radially through) the engine case 70 at (e.g., on, adjacent, or proximate) the turbine vane stage 72.

The turbine vane stage 72 includes an outer ring 90, an inner ring 92, and a plurality of turbine vanes 94 collectively forming the turbine vane stage 72 (e.g., a vane assembly).

The turbine vane stage 72 may additionally include a gas seal 96. The turbine vane stage 72 is disposed between (e.g., axially between) the upstream rotor stage 66 and the downstream rotor stage 68. The outer ring 90 and the inner ring 92 extend circumferentially about (e.g., completely around) the rotational axis 44. The outer ring 90 is mounted to or otherwise disposed at (e.g., on, adjacent, or proximate) the engine case 70. The outer ring 90 forms an air plenum 98 (e.g., an annular air plenum) at (e.g., on, adjacent, or proximate) and connected in fluid communication with the TCA ports 88. Each of the turbine vanes 94 is disposed between (e.g., radially between) the outer ring 90 and the inner ring 92. The turbine vanes 94 are arrayed circumferentially about the rotational axis 44 between the outer ring 90 and the inner ring 92.

Each of the turbine vanes 94 includes a vane body 100 and an internal baffle 102. The vane body 100 is configured as an airfoil extending in a chordwise direction between and to a leading edge 104 of the vane body 100 and a trailing edge 106 of the vane body 100. The vane body 100 extends (e.g., radially extends) between and to an outer radial end 108 of the vane body 100 and an inner radial end 110 of the vane body 100. The outer radial end 108 is mounted to or otherwise disposed at (e.g., on, adjacent, or proximate) the outer ring 90. The inner radial end 110 is mounted to or otherwise disposed at (e.g., on, adjacent, or proximate) the inner ring 92. The vane body 100 extends radially through the core flow passage 78 to guide combustion gas along the core flow path 62 onto the turbine blades 82 of the downstream rotor stage 68. The vane body 100 forms and surrounds an internal cavity 112 of the vane body 100. The internal cavity 112 extends through (e.g., radially through) the vane body 100 between the outer radial end 108 and the inner radial end 110. The internal cavity 112 is open at the outer radial end 108 to connect the internal cavity 112 in fluid communication with the air plenum 98. The inner ring 92 encloses the internal cavity 112 at (e.g., on, adjacent, or proximate) the inner radial end 110. The internal cavity 112 may be aligned with (e.g., axially and circumferentially coincident with) one of the TCA ports 88.

The internal baffle 102 is mounted to the vane body 100 within the internal cavity 112. The internal baffle 102 is spaced from the vane body 100 and subdivides the internal cavity 112 into an inner cavity portion 112A and an outer cavity portion 112B. The internal baffle 102 includes apertures (not shown) extending through the internal baffle 102 from the inner cavity portion 112A to the outer cavity portion 112B. The internal baffle 102 is configured to distribute air flow from the TCA ports 88 through the internal cavity 112 (e.g., from the inner cavity portion 112A to the outer cavity portion 112B) to facilitate cooling of the vane body 100.

The gas seal 96 may be mounted to or otherwise disposed at (e.g., on, adjacent, or proximate) and radially inward of the inner ring 92. The gas seal 96 further forms and seals the rotor cavity 86. In particular, the gas seal 96 seals the rotor cavity 86 from the combustion gas flow through the core flow passage 78. The gas seal 96 of FIG. 3 includes a seal body 114, a first seal member 116 (e.g., a carbon seal), and a second seal member 118 (e.g., a carbon seal). The seal body 114, the first seal member 116, and the second seal member 118 may extend circumferentially about (e.g., completely around) the rotational axis 44, for example, as a full hoop or as circumferential segments. The first seal member 116 and the second seal member 118 are mounted on the seal body 114. The first seal member 116 is disposed in sealing contact with the rotor disk 74, for example, at a knife edge 120 of the rotor disk 74. Similarly, the second seal member 118 is disposed in sealing contact with the rotor disk 80, for example, at a knife edge 122 of the rotor disk 74.

Each of the TCA ports 88 is connected in fluid communication with a pressurized air source 124 by a TCA pipe 126 mounted on the engine case 70 at the respective one of the TCA ports 88. The air source 124 may be, for example, a discharge or intermediate stage of the low-pressure compressor 30A or the high-pressure compressor 30B. The air source 124 is configured to direct pressurized cooling air 128 (e.g., compressor bleed air) through the TCA pipe 126 for each of the TCA ports 88 to the turbine vane stage 72 (e.g., the internal baffle 102 of each of the turbine vanes 94) to facilitate cooling of the turbine vane stage 72 (e.g., the vane body 100 of each of the turbine vanes 94).

Figure 4:
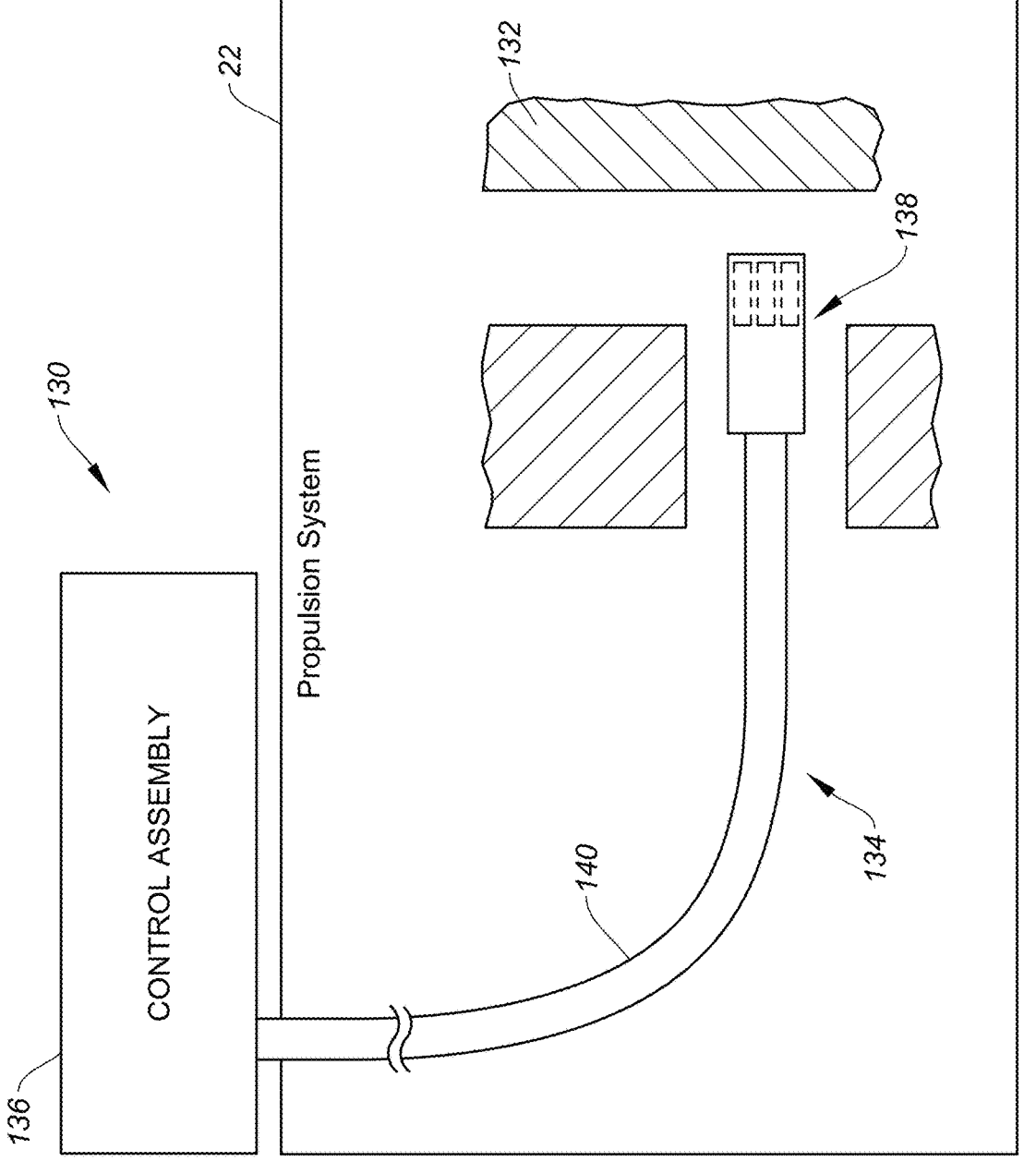
FIG. 4 schematically illustrates an inspection system, in accordance with one or more embodiments of the present disclosure.

FIG. 4 schematically illustrates an inspection system 130 for inspecting a component 132 of the aircraft propulsion system 22 such as, but not limited to, the rotor disks 74, 80 (see FIG. 3). The inspection system 130 may be configured to facilitate inspection of the component 132 while the component 132 remains installed with the propulsion system 22 on the aircraft 20 (e.g., the propulsion system 22 remains installed on wing, on fuselage, in airframe, etc.). The component 132, for example, may be disposed within an interior (e.g., an enclosed volume, an encased volume, etc.) of the propulsion system 22. Inspection of the component 132 may also be performed using the inspection system 130 while outside of an aircraft hangar and/or a dedicated inspection and/or repair facility (e.g., on a tarmac at an airport between aircraft flights). Inspection of the component 132 may thereby be performed with a relatively short aircraft downtime and/or a relatively minimal expense. The inspection system 130, of course, may also be used for inspecting the component 132 installed with the propulsion system 22 when that propulsion system 22 is not installed with the aircraft 20 (e.g., prior to installation with the aircraft 20 or following removal from the aircraft 20) or with the component 132 removed from the propulsion system 22. Inspection of the component 132 using the inspection system 130 may facilitate the identification of one or more internal defects of the component 132 such as cracks, voids, etc. (e.g., embedded within material of) the component 132. The term "defect," as used herein, shall refer to a physical anomaly present within a component (e.g., the component 132) which negatively affects the useful life or performance of the component.

The component 132 may be any inspectable (e.g., metal) component within the propulsion system 22. However, for ease of description, the component 132 may be described below as a rotor disk (e.g., one or both of the rotor disk 74 or the rotor disk 80). The rotor disk may be a turbine disk such as a rotor disk in a high-pressure turbine (HPT) or a low-pressure turbine (LPT) of a gas turbine engine. Alternatively, the rotor disk may be a compressor disk such as a rotor disk in a low-pressure compressor (LPC) or a high-pressure compressor (HPC) of a gas turbine engine. The present disclosure, however, is not limited to such exemplary component 132 configurations. The component 132, for example, may alternatively be configured as a hub, a shaft or any rotating component within the propulsion system 22.

The inspection system 130 of FIG. 4 is configured as an ultrasonic testing (UT) system. For example, the inspection system 130 may be configured for ultrasonic testing, process compensated resonance testing (PCRT), and/or other nondestructive testing (NDT) techniques involving application of ultrasonic vibration to a test object (e.g., the component 132). The inspection system 130 of FIG. 4 includes a probe assembly 134 and a control assembly 136.

The probe assembly 134 may be a borescope probe assembly configured for insertion into the propulsion system 22 (e.g., the gas turbine engine 24) for inspection of the component 132. However, the probe assembly 134 of the present disclosure is not limited to borescope probe assembly configurations. The probe assembly 134 of FIG. 4, for example, includes a probe 138 (e.g., a UT probe) and a guide tube 140. The probe 138 may include one or more ultrasonic actuators and/or sensors (e.g., piezoelectric transducers). The guide tube 140 may extend all or a substantial portion of a distance from the probe 138 to the control assembly 136. The guide tube 140 may be configured as a conduit to house and protect wiring extending between the probe 138 and the control assembly 136. The guide tube 140 may be a flexible body. For example, the guide tube 140 may include one or more internal actuators for manipulating a configuration of the guide tube 140 to aid in maneuvering the probe 138 and the guide tube 140 within the propulsion system 22 to the component 132.

Inspection of the component 132, for example, the rotor disk 74 and/or the rotor disk 80, may require probe 138 access to portions of the gas turbine engine 24 which may typically be inaccessible with the gas turbine engine 24 in an assembled state. Conventionally, inspection of similar gas turbine engine components may require disassembly of substantial portions of the gas turbine engine. These conventional inspection practices may preclude inspection of the gas turbine engine components while the gas turbine engine is installed with a propulsion system on wing or otherwise off wing but in a substantially assembled state, thereby greatly increasing maintenance, inspection, and repair times as well as extending aircraft on ground (AOG) time.

Referring to FIG. 5, a method 500 for forming an access passage for a rotor cavity of a gas turbine engine is provided. The method 500 may be performed in preparation for or in combination with inspection of an aircraft propulsion system component (e.g., the component 132) using an inspection system (e.g., the inspection system 130). The method 500 may facilitate subsequent inspection of component conditions indicative of one or more internal defects of the component, for example, using resonance inspection data, while the component remains installed with its aircraft propulsion system (e.g., in an on-wing or off-wing condition) to facilitate identification of one or more internal defects of the component such as cracks, voids, etc. (e.g., embedded within material of) the component. FIG. 5 illustrates a flowchart for the method 500. Aspects of the method 500 are described herein with respect to the turbine section 34 components of FIG. 4, including the upstream rotor stage 66, the downstream rotor stage 68, the engine case 70, and the turbine vane stage 72, to facilitate formation of an access passage (e.g., for the probe 138) to the rotor disk 74 and/or the rotor disk 80 at the rotor cavity 86. In particular, steps of the method 500 are described herein for a turbine vane 94A of the turbine vanes 94; however, the method 500 may be performed for more than one of the turbine vanes 94 to facilitate access to the rotor disk 74 and/or the rotor disk 80. However, aspects of the method 500 are not limited to use for the foregoing exemplary turbine section 34 components 66, 68, 70, 72 of FIG. 4. Unless otherwise noted herein, it should be understood that the steps of method 500 are not required to be performed in the specific sequence in which they are discussed below and, in some embodiments, the steps of the method 500 may be performed separately or simultaneously.

With continued reference to FIG. 3, step 502 includes accessing the turbine vane 94A through the engine case 70. For example, the turbine vane 94A of FIG. 3 may be accessed through the engine case 70 at a TCA port 88A, 88 disposed at (e.g., axially and circumferentially coincident with) the turbine vane 94A. A TCA pipe 126A, 126 installed on the engine case 70 and connected in fluid communication with the TCA port 88A may be removed from the engine case 70, for example, by uninstalling a pipe flange 142 of the TCA pipe 126A, 126 (e.g., removing mounting fasteners between the pipe flange 142 and the engine case 70).

Step 504 includes removing the internal baffle 102 from the turbine vane 94A. The internal baffle 102 may be destructively removed from the turbine vane 94A by machining all or portions of the internal baffle 102 using machining tooling maneuvered into the turbine vane 94A (e.g., the vane body 100) through the TCA port 88A. For example, the internal baffle 102 may be detached from the vane body 100 by machining (e.g., grinding) weld points between the internal baffle 102 and the vane body 100, and subsequently removing the internal baffle 102 from the internal cavity 112 through the TCA port 88A.

Figure 6:
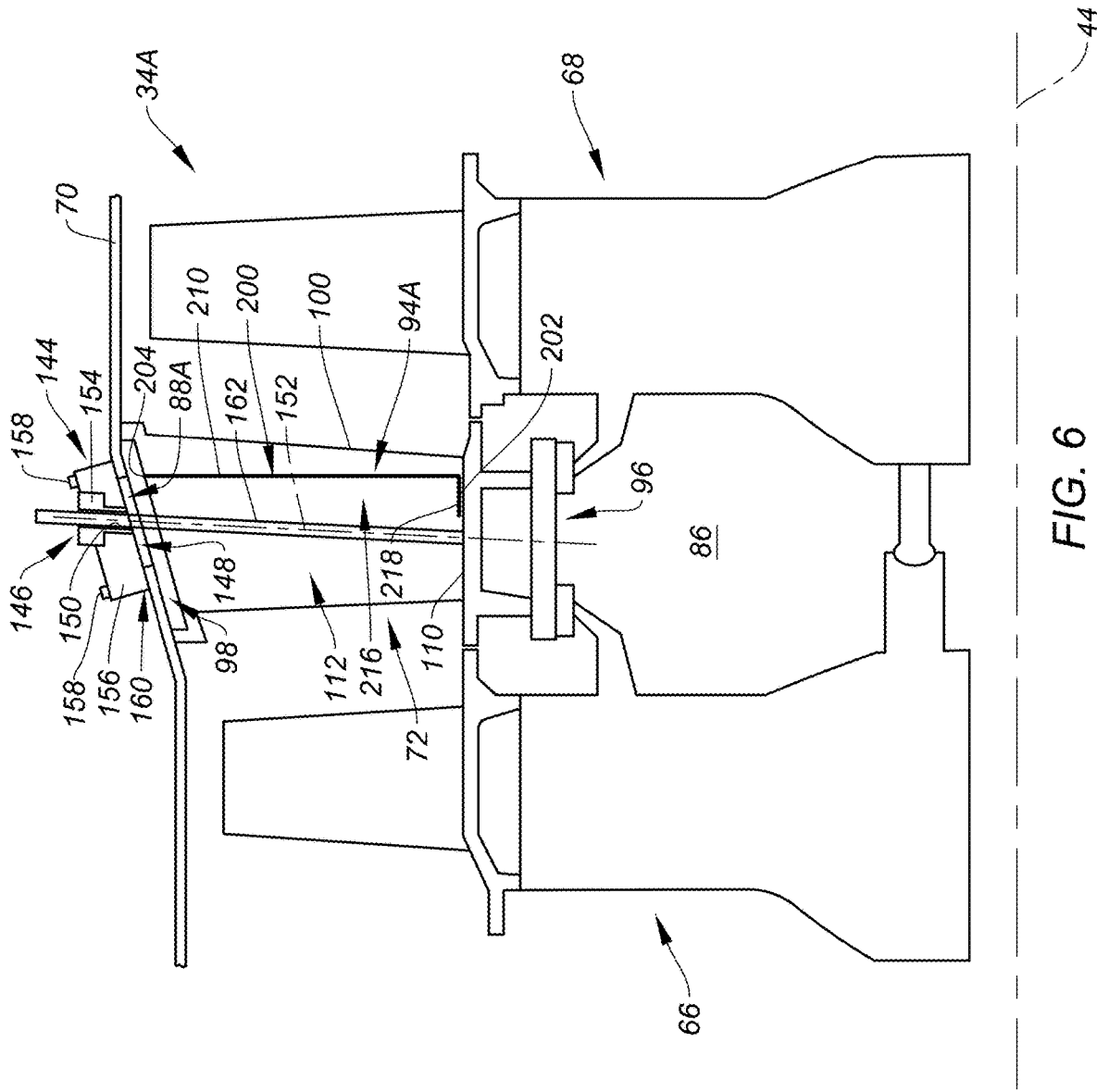
FIG. 6 schematically illustrates a portion of the turbine vane stage with a tooling jig and an alignment tool, in accordance with one or more embodiments of the present disclosure.
Figures 7, 8, 9:
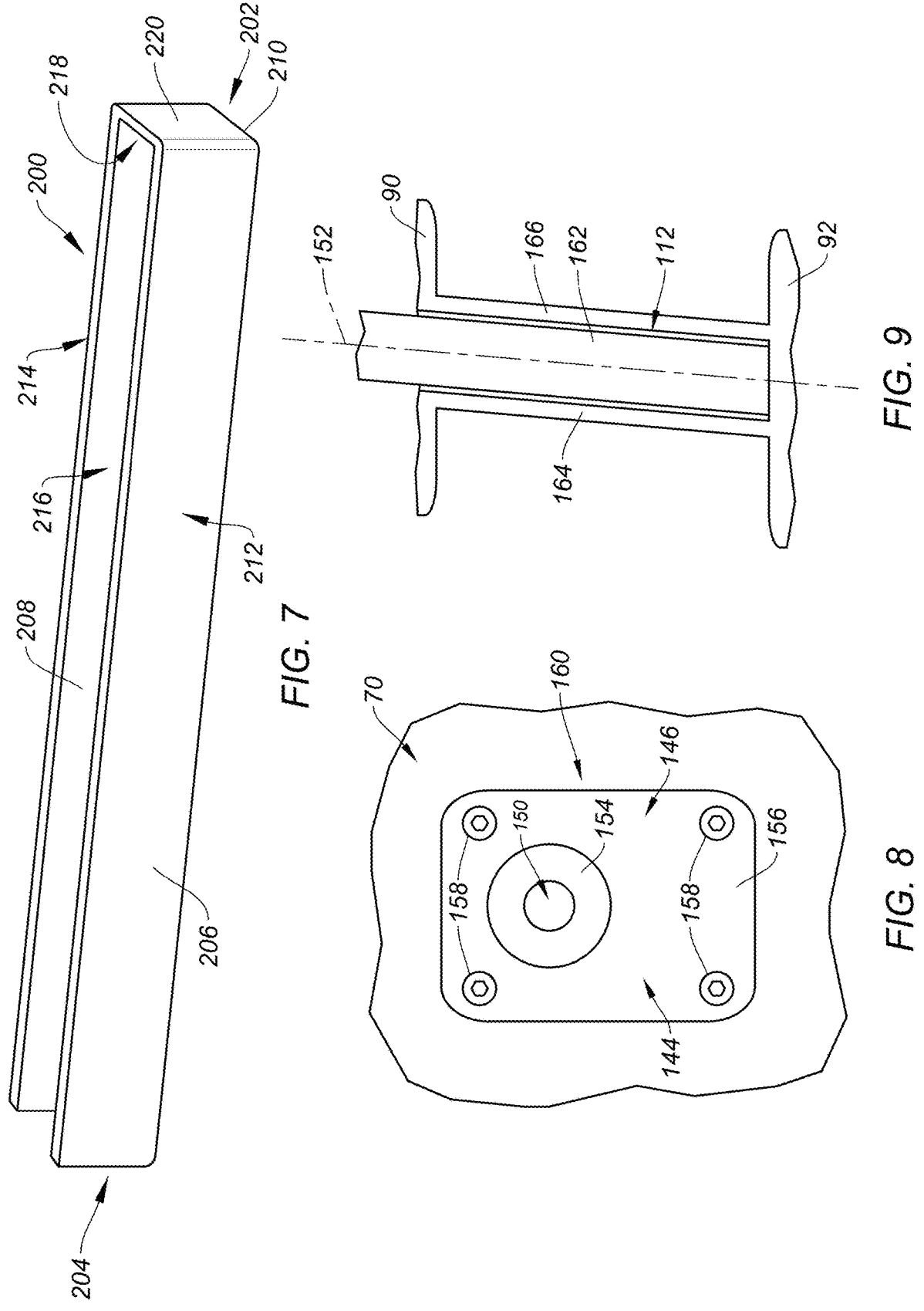
FIG. 7 illustrates a perspective view of a swarf collection plug, in accordance with one or more embodiments of the present disclosure.
FIG. 8 schematically illustrates the tooling jig, in accordance with one or more embodiments of the present disclosure.
FIG. 9 schematically illustrates a cutaway, side view of a portion of the turbine vane stage including a turbine vane body and the alignment tool, in accordance with one or more embodiments of the present disclosure.

Referring to FIGS. 6 and 7, step 506 includes (optionally) installing a swarf collection plug 200 into the vane body 100. FIG. 6 schematically illustrates a portion of the high-pressure turbine 34A showing the turbine vane 94A at a stage of the method 500. FIG. 7 illustrates a perspective view of the swarf collection plug 200. The swarf collection plug 200 of FIG. 7 extends between and to an inner radial end 202 of the swarf collection plug 200 and an outer radial end 204 of the swarf collection plug 200 (e.g., relative to a general orientation of the swarf collection plug 200 within the turbine vane 94A). The swarf collection plug 200 includes a first side wall 206, a second side wall 208, and an end wall 210. The first side wall 206, the second side wall 208, and the end wall 210 extend between and to the inner radial end 202 and the outer radial end 204. The first side wall 206 extends along a first side 212 of the swarf collection plug 200. The second side wall 208 extends along a second side 214 of the swarf collection plug 200 opposite the first side 212. The end wall 210 extends between and connects the first side wall 206 and the second side wall 208. The first side wall 206, the second side wall 208, and the end wall 210 form a swarf collection cavity 216 extending between the inner radial end 202 and the outer radial end 204. For example, the first side wall 206, the second side wall 208, and the end wall 210 may form a U-cross-sectional shape of the swarf collection plug 200 extending from the inner radial end 202 to the outer radial end 204. The swarf collection cavity 216 may be enclosed at (e.g., on, adjacent, or proximate) the inner radial end 202 by an enclosure member 218. For example, the swarf collection plug 200 may include an end wall 220 at (e.g., on, adjacent, or proximate) the inner radial end 202 forming the enclosure member 218. Alternatively, the swarf collection plug 200 may include an insert or other body forming the enclosure member 218 enclosing an inner radial end of the swarf collection cavity 216 within the swarf collection plug 200. The swarf collection plug 200 may be inserted into the turbine vane 94A (e.g., the internal cavity 112) through the TCA port 88A with the inner radial end 202 disposed at (e.g., on, adjacent, or proximate) the inner radial end 110 and with the outer radial end 204 disposed at (e.g., on, adjacent, or proximate) the outer radial end 108. The swarf collection plug 200 may be snuggly fitted within the turbine vane 94A, for example, with the side walls 206, 208 positioned at (e.g., on, adjacent, or proximate) opposing interior side walls of the turbine vane 94A. With the swarf collection plug 200 installed in the turbine vane 94A, the swarf collection cavity 216 and the enclosure member 218 may facilitate collection of swarf generated in steps of the method 500, as well as preventing the generated swarf from collecting in air flow passages, openings, crevasses, and other difficult to access portions of the turbine vane 94A.

Referring to FIGS. 6 and 8, step 508 includes attaching a tooling jig 144 onto the engine case 70 at the TCA port 88A. The tooling jig 144 extends between and to an outer radial end 146 of the tooling jig 144 and an inner radial end 148 of the tooling jig 144. The tooling jig 144 forms a tooling aperture 150. The tooling aperture 150 extends through the tooling jig 144 from the outer radial end 146 to the inner radial end 148 along a tooling axis 152. With the tooling jig 144 installed on the engine case 70 at the TCA port 88A, the tooling axis 152 extends through the TCA port 88A, the air plenum 98, and the internal cavity 112 of the turbine vane 94A. In some embodiments, the tooling jig 144 may include a bushing 154 forming the tooling aperture 150 through the tooling jig 144. The bushing 154 may be mounted into a jig body 156 of the tooling jig 144. The bushing 154 may be selectively mountable on the jig body 156, for example, to facilitate the use of bushings 154 having different tooling aperture 150 diameters to accommodate different tooling (e.g., drill bits, alignment tools, cleaning tools, etc.). The tooling jig 144 (e.g., the jig body 156) may be mounted onto the engine case 70 by a plurality of mechanical fasteners 158 (e.g., bolts). For example, the mechanical fasteners 158 may mount the tooling jig 144 (e.g., the jig body 156) to a flange interface 160 of the engine case 70 at (e.g., on, adjacent, or proximate) the TCA port 88A. The tooling jig 144 may be mounted onto the engine case 70 with the mechanical fasteners 158 installed in a loosened state (e.g., not fully threaded into the engine case 70 at the flange interface 160). With the mechanical fasteners 158 in this loosened state, the tooling jig 144 may still be moveable relative to the engine case 70. Alternatively, the tooling jig 144 may be fixedly mounted to the engine case 70 by the mechanical fasteners 158 in accordance with step 508.

Step 510 includes, optionally, aligning the tooling jig 144 on the engine case 70 at the TCA port 88A. The tooling jig 144 may be aligned on the engine case 70 with the mechanical fasteners 158 mounting the tooling jig 144 onto the engine case 70 and in the loosened state (see step 508). Step 510 may include inserting an alignment tool 162 into the internal cavity 112 of the turbine vane 94A through the tooling aperture 150 along the tooling axis 152. FIG. 9 schematically illustrates a side, cutaway view of the alignment tool 162 inserted into the turbine vane 94A (e.g., the vane body 100). The alignment tool 162 may be a straight or substantially straight rod (e.g., cylindrical shaft) configured to fit within the internal cavity 112 and to contact the inner ring 92 (or inner radial boundary of the internal cavity 112) while also extending through the tooling jig 144 (e.g., the tooling aperture 150). As shown in FIG. 9, the alignment tool 162 may be sized to fit snugly within the internal cavity 112, for example, between a pressure side wall 164 and a suction side wall 166 of the vane body 100 such that motion of the alignment tool 162 transverse to the tooling axis 152 is prevented or substantially restricted. With the alignment tool 162 inserted into the internal cavity 112 and contacting the inner ring 92 (or inner radial boundary of the internal cavity 112), the mechanical fasteners 158 may be further threaded and/or tightened to fixedly mount the tooling jig 144 on the engine case 70 in an aligned condition.

Figure 10:
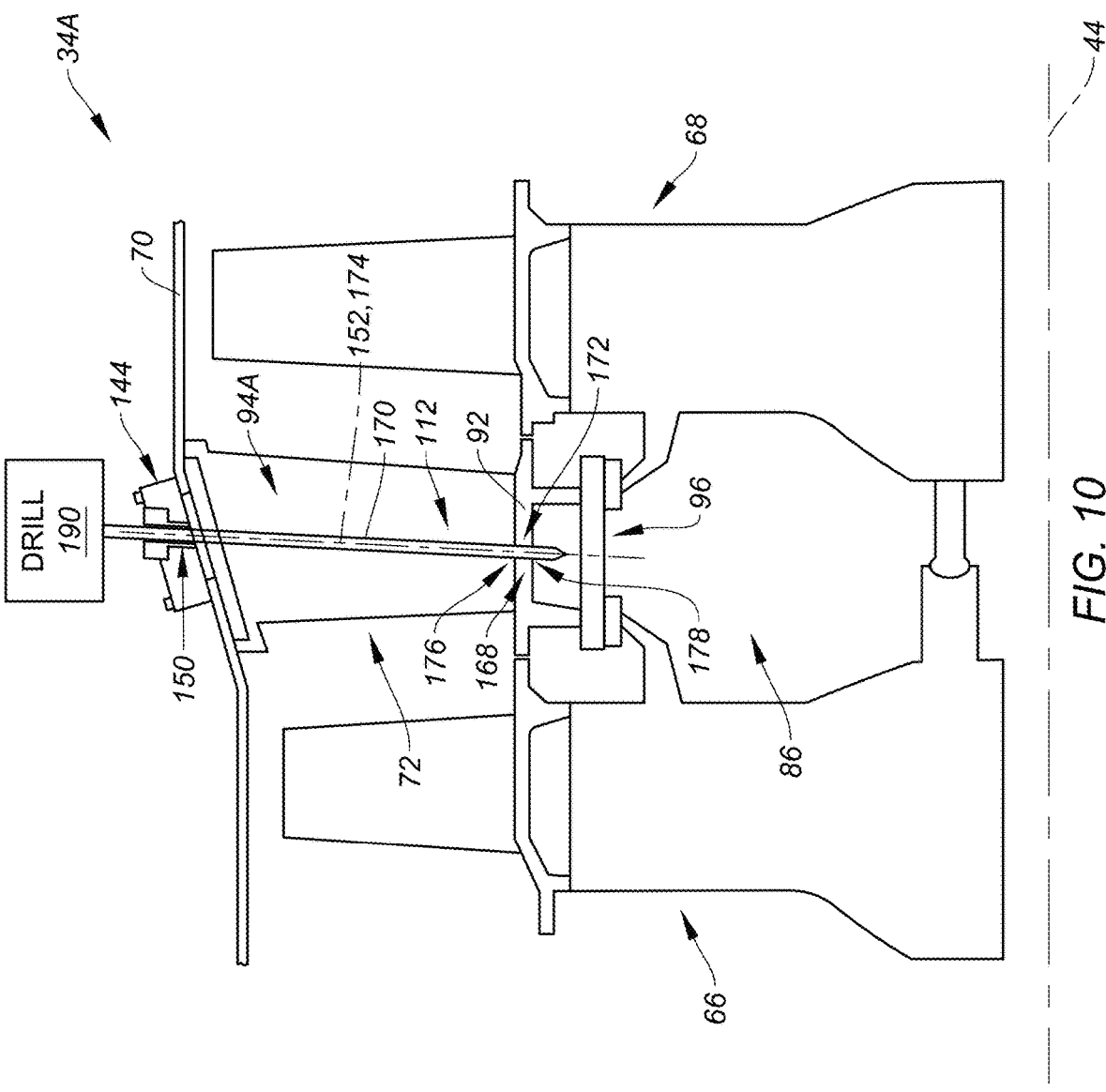
FIG. 10 schematically illustrates a portion of the turbine vane stage, in accordance with one or more embodiments of the present disclosure.

Referring to FIG. 10, step 512 includes drilling through the inner ring 92 to form a portion of an access passage 168 to the rotor cavity 86. Step 512 includes inserting a drill bit 170 into the turbine vane 94A through the tooling aperture 150 along the tooling axis 152. The drill bit 170 may be rotationally driven by a drill 190 disposed radially outside the engine case 70. The drill bit 170 forms a first access aperture 172 through the inner ring 92 along a drill path 174 at (e.g., on, adjacent, or proximate) the tooling axis 152. For example, the first access aperture 172 may extend through the inner ring 92 from an outer radial end 176 of the first access aperture 172 at (e.g., on, adjacent, or proximate) the internal cavity 112 to an inner radial end 178 of the first access aperture 172 along the tooling axis 152 and/or the drill path 174. Step 512 may include periodically interrupting the drilling process of step 512 to remove swarf accumulation within the turbine vane 94A.

Figure 11:
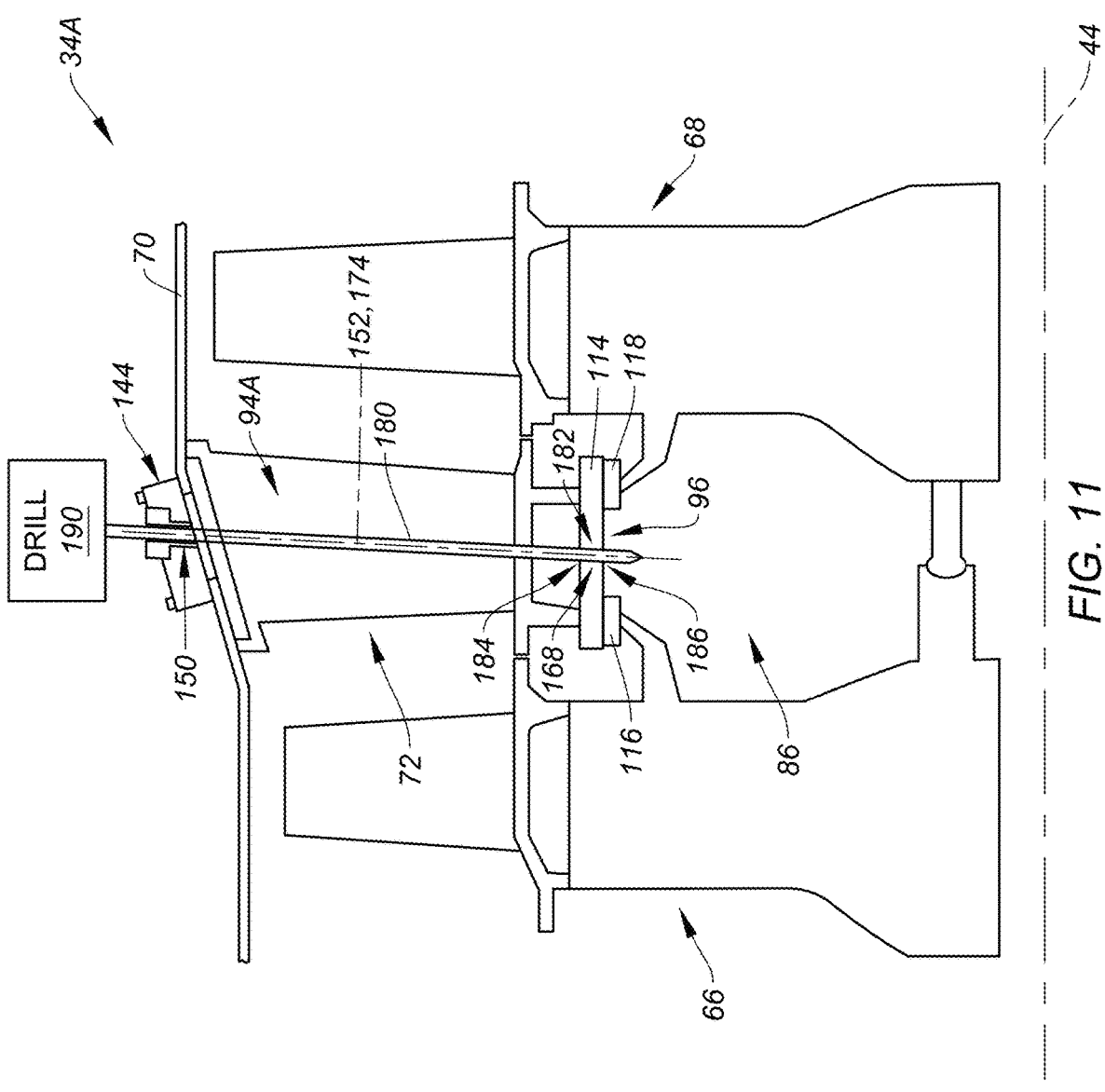
FIG. 11 schematically illustrates a portion of the turbine vane stage, in accordance with one or more embodiments of the present disclosure.

Referring to FIG. 11, step 514 includes, for embodiments of the turbine vane stage 72 including the gas seal 96, drilling through the gas seal 96 (e.g., the seal body 114) to form another portion of the access passage 168 to the rotor cavity 86. Step 514 includes inserting a drill bit 180 to the gas seal 96, through the first access aperture 172, along the tooling axis 152. The drill bit 180 may be rotationally driven by a drill 190 disposed radially outside the engine case 70. The drill bit 180 may be the same as or different than the drill bit 170 (e.g., a same or different diameter). The drill bit 180 forms a second access aperture 182 through the gas seal 96 along the drill path 174. For example, the second access aperture 182 may extend through the gas seal 96 from an outer radial end 184 of the second access aperture 182 to an inner radial end 186 of the second access aperture 182 at (e.g., on, adjacent, or proximate) the rotor cavity 86 along the tooling axis 152 and/or the drill path 174. The inner radial end 186 may be disposed between (e.g., axially between) the first seal member 116 and the second seal member 118. Step 514 may include periodically interrupting the drilling process of step 514 to remove swarf accumulation at (e.g., on, adjacent, or proximate) the gas seal 96.

Figure 12:
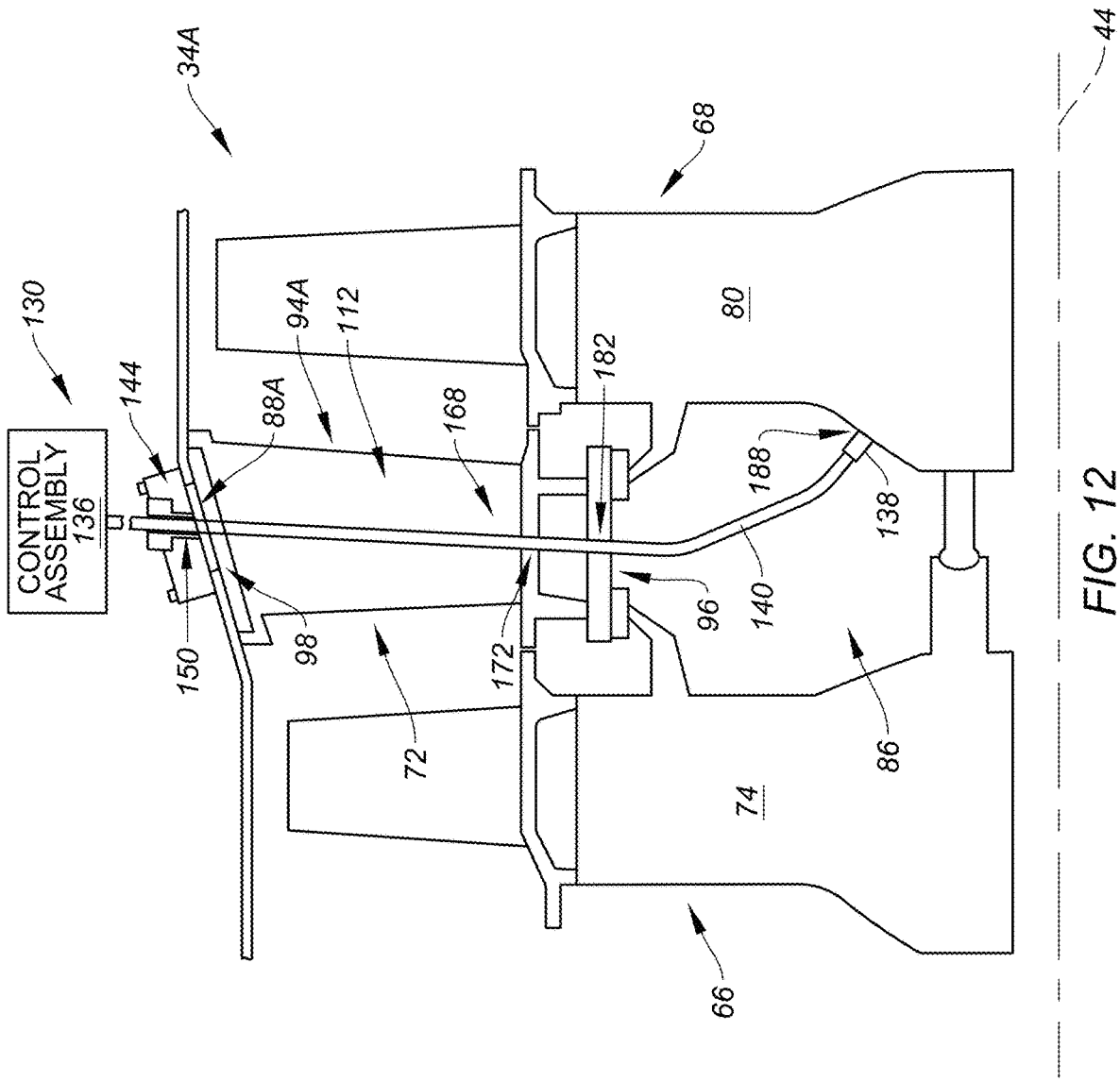
FIG. 12 schematically illustrates a portion of the turbine vane stage and the inspection system, in accordance with one or more embodiments of the present disclosure.

Referring to FIG. 12, step 516 includes inspecting the rotor disk 74 and/or the rotor disk 80, for example, using the inspection system 130. Step 516 includes inserting the probe 138 into the rotor cavity 86 through the access passage 168, wherein the access passage 168 includes the TCA port 88A, the air plenum 98, the internal cavity 112, the first access aperture 172, and the second access aperture 182. For example, the probe 138 may be maneuvered to the rotor cavity 86 through the access passage 168 by operation of the guide tube 140. The probe 138 may be positioned at one or more inspection sites 188 of the rotor disk 74 and/or the rotor disk 80. For example, the probe 138 may be positioned on surfaces of the rotor disk 74 and/or the rotor disk 80 forming the rotor cavity 86 at the inspection sites 188. Resonance inspection data captured by the inspection system 130 may be used to identify defect conditions of the rotor disk 74 and/or the rotor disk 80, for example, in combination with ultrasonic testing, process compensated resonance testing (PCRT), and/or other non-destructive testing (NDT) techniques.

Step 518 may include restoring the turbine vane stage 72 to a condition for operation of the gas turbine engine 24. For example, step 518 may include removal of the tooling jig 144 from the engine case 70, removal of the swarf collection plug 200, installation of a new internal baffle for the turbine vane 94A, and/or reinstallation of the TCA pipe 126 for the TCA port 88A.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for forming an access passage for a gas turbine engine of an aircraft propulsion system, the method comprising:

installing a tooling jig on an engine case of the gas turbine engine at a port, the port disposed at a turbine section of the gas turbine engine radially outward of a turbine vane stage, the tooling jig forming a tooling aperture extending through the tooling jig along a tooling axis;

aligning the tooling jig on the engine case by inserting an alignment tool through the tooling aperture and into a first turbine vane of the turbine vane stage along the tooling axis and, with the alignment tool disposed within the tooling aperture and the first turbine vane, fixedly mounting the tooling jig on the engine case such that the tooling axis extends through an internal cavity of the first turbine vane to an inner ring of the turbine vane stage; and drilling a first access aperture of the access passage through the inner ring along the tooling axis with a first drill bit inserted into the first turbine vane through the tooling aperture, the access passage extending through the turbine vane stage to a rotor cavity disposed radially inward of the turbine vane stage, the rotor cavity further formed by and axially between an upstream rotor stage and a downstream rotor stage of a bladed turbine rotor relative to a rotational axis of the bladed turbine rotor.

2. The method of claim 1, wherein installing the tooling jig on the engine case includes installing the tooling jig on the engine case with a plurality of mechanical fasteners in a loosened state and fixedly mounting the tooling jig on the engine case includes fixedly mounting the tooling jig with the plurality of mechanical fasteners.

3. The method of claim 1, further comprising removing an internal baffle from the first turbine vane through the port prior to installing the tooling jig on the engine case.

4. The method of claim 1, further comprising removing a cooling air pipe connected at the port from the engine case prior to installing the tooling jig on the engine case.

5. The method of claim 1, wherein the tooling jig includes a jig body and a bushing selectively attachable on the jig body, fixedly mounting the tooling jig on the engine case includes fixedly mounting the jig body on the engine case, and the bushing forms the tooling aperture through the tooling jig along the tooling axis.

6. The method of claim 1, further comprising, subsequent to drilling the first access aperture, drilling a second access aperture of the access passage through a gas seal along the tooling axis with a second drill bit inserted through the tooling aperture, the gas seal mounted on the inner ring, the gas seal disposed radially between the inner ring and the rotor cavity, the gas seal in sealing engagement with the upstream rotor stage and the downstream rotor stage.

7. The method of claim 1, further comprising installing a swarf collection plug into the first turbine vane through the port prior to installing the tooling jig on the engine case.

8. The method of claim 7, wherein the swarf collection plug extends between and to an inner radial plug end and an outer radial plug end, the swarf collection plug forms a swarf collection cavity enclosed at the inner radial plug end, and with the swarf collection plug installed into the first turbine vane, the inner radial plug end is disposed at the inner ring.

9. The method of claim 1, further comprising inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

10. The method of claim 9, wherein the steps of inserting the probe and inspecting the one or both of the upstream rotor stage or the downstream rotor stage are performed with the aircraft propulsion system installed on an aircraft.

11. A method for forming an access passage for a gas turbine engine of an aircraft propulsion system, the method comprising:

installing a tooling jig on an engine case of the gas turbine engine at a port, the port disposed at a turbine section of the gas turbine engine radially outward of a turbine vane stage, the tooling jig forming a tooling aperture extending through the tooling jig along a tooling axis, the tooling axis extending through an internal cavity of a first turbine vane of the turbine vane stage to an inner ring of the turbine vane stage;

drilling a first access aperture of the access passage through the inner ring along the tooling axis with a first drill bit extending through the tooling aperture; and drilling a second access aperture of the access passage through a gas seal along the tooling axis with a second drill bit extending through the tooling aperture, the gas seal mounted on the inner ring, the gas seal forming a rotor cavity disposed radially inward of the gas seal, the rotor cavity further formed by and between an upstream rotor stage and a downstream rotor stage of a bladed turbine rotor relative to a rotational axis of the bladed turbine rotor, the access passage extending through the port, the internal cavity, the first access aperture, and the second access aperture along the tooling axis.

12. The method of claim 11, wherein the gas seal includes a seal body, a first seal member, and a second seal member, the first seal member and the second seal member are mounted on the seal body, the first seal member is disposed in sealing engagement with the upstream rotor stage, the second seal member is disposed in sealing engagement with the downstream rotor stage, and the second access aperture extends through the seal body between the first seal member and the second seal member.

13. The method of claim 11, further comprising installing a swarf collection plug into the first turbine vane through the port prior to installing the tooling jig on the engine case.

14. The method of claim 11, further comprising inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

15. The method of claim 14, wherein the upstream rotor stage includes a first rotor component, the downstream rotor stage includes a second rotor component, the first rotor component and the second rotor component form the rotor cavity, and positioning the probe on the one or both of the upstream rotor stage or the downstream rotor stage includes positioning the probe at a plurality of inspection sites on surfaces of one or both of the first rotor component or the second rotor component forming the rotor cavity.

16. A method for forming an access passage for a gas turbine engine of an aircraft propulsion system, the method comprising:

removing a cooling air pipe connected at a port of the engine, the port disposed at an engine case surrounding a turbine section of the gas turbine engine radially outward of a turbine vane stage, the turbine vane stage including a first turbine vane, the first turbine vane including an internal cavity and an internal baffle disposed within the internal cavity;

removing the internal baffle from the first turbine vane through the port;

installing a tooling jig on the engine case at the port, the tooling jig forming a tooling aperture extending through the tooling jig along a tooling axis;

drilling a first access aperture of the access passage through an inner ring of the turbine vane stage along the tooling axis with a first drill bit inserted into the first turbine vane through the tooling aperture, the access passage extending through the turbine vane stage to a rotor cavity disposed radially inward of the turbine vane stage, the rotor cavity further formed by and axially between an upstream rotor stage and a downstream rotor stage of a bladed turbine rotor relative to a rotational axis of the bladed turbine rotor.

17. The method of claim 16, further comprising installing a swarf collection plug into the first turbine vane through the port prior to installing the tooling jig on the engine case.

18. The method of claim 16, wherein removing the internal baffle from the first turbine vane includes machining at least a portion of the internal baffle.

19. The method of claim 16, further comprising, subsequent to drilling the first access aperture, drilling a second access aperture of the access passage through a gas seal along the tooling axis with a second drill bit inserted through the tooling aperture, the gas seal mounted on the inner ring, the gas seal disposed radially between the inner ring and the rotor cavity, the gas seal in sealing engagement with the upstream rotor stage and the downstream rotor stage.

20. The method of claim 16, further comprising inserting a probe of a non-destructive testing inspection system through the access passage to the rotor cavity and inspecting one or both of the upstream rotor stage or the downstream rotor stage by positioning the probe on the one or both of the upstream rotor stage or the downstream rotor stage within the rotor cavity.

\* \* \* \* \*